United States Patent
Hashimoto et al.

(10) Patent No.: US 12,555,924 B2
(45) Date of Patent: Feb. 17, 2026

(54) ANTENNA DEVICE

(71) Applicant: KABUSHIKI KAISHA TOSHIBA, Tokyo (JP)

(72) Inventors: Koh Hashimoto, Yokohama Kanagawa (JP); Kentaro Wada, Kawasaki Kanagawa (JP); Ryota Sekiya, Kamakura Kanagawa (JP); Hiroshi Yoshida, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 241 days.

(21) Appl. No.: 18/358,303

(22) Filed: Jul. 25, 2023

(65) Prior Publication Data
US 2024/0243486 A1 Jul. 18, 2024

(30) Foreign Application Priority Data
Jan. 17, 2023 (JP) .................. 2023-005140

(51) Int. Cl.
*H01Q 21/00* (2006.01)
*H01Q 1/22* (2006.01)
(Continued)

(52) U.S. Cl.
CPC .......... *H01Q 21/0037* (2013.01); *H01Q 1/22* (2013.01); *H01Q 21/24* (2013.01); *G01S 7/352* (2013.01)

(58) Field of Classification Search
CPC .......... H01Q 21/0037; H01Q 21/0025; H01Q 21/06; H01Q 21/061; H01Q 21/08; H01Q 21/24; G01S 13/88; G01S 13/887
See application file for complete search history.

(56) References Cited

U.S. PATENT DOCUMENTS 7,170,446 B1 * 1/2007 West ............ H01Q 13/085
342/372
8,427,360 B2 * 4/2013 Longstaff ........ G01S 13/913
342/120
(Continued)

FOREIGN PATENT DOCUMENTS

JP 2006165976 A 6/2006
JP 2021093711 A 6/2021
(Continued)

OTHER PUBLICATIONS

Japanese Office Action (and an English language translation thereof) dated Nov. 13, 2025, issued in counterpart Japanese Application No. 2023-005140.

*Primary Examiner* — Jason M Crawford
(74) *Attorney, Agent, or Firm* — Holtz, Holtz & Volek PC

(57) ABSTRACT

According to one embodiment, an antenna device includes a first antenna and a second antenna. The first antenna includes a first substrate and a plurality of first elements. The first substrate includes a first face along a first direction and a second direction. The plurality of first elements are arranged along the second direction. The second antenna includes a second substrate and a plurality of second elements. The second substrate includes a second face along the first direction and a third direction. The plurality of second elements are arranged along the third direction. The third direction crosses a plane including the first direction and the second direction. One of the plurality of first elements overlaps the second substrate in the third direction.

18 Claims, 8 Drawing Sheets

(51) Int. Cl.
  *H01Q 21/24* (2006.01)
  *G01S 7/35* (2006.01)

(56) References Cited

U.S. PATENT DOCUMENTS

| | | | |
|---|---|---|---|
| 9,638,795 B2 | 5/2017 | Ahmed | |
| 9,869,762 B1* | 1/2018 | Alland | H01Q 21/08 |
| 11,509,073 B2* | 11/2022 | Nikishov | G01S 13/931 |
| 2009/0033556 A1* | 2/2009 | Stickley | H01Q 21/0006 342/25 A |
| 2010/0220001 A1* | 9/2010 | Longstaff | H01Q 1/007 342/201 |
| 2020/0083948 A1* | 3/2020 | Lim | H04B 7/0814 |
| 2020/0119453 A1* | 4/2020 | Takayama | H01Q 1/243 |
| 2020/0161749 A1* | 5/2020 | Onaka | H01Q 21/24 |
| 2020/0161775 A1* | 5/2020 | Zhu | H01Q 21/28 |
| 2020/0303834 A1* | 9/2020 | Suzuki | H04B 7/10 |
| 2020/0403324 A1 | 12/2020 | Ying et al. | |
| 2021/0028546 A1* | 1/2021 | Yamada | H04B 1/48 |
| 2021/0111479 A1* | 4/2021 | Spalink | G01S 13/89 |
| 2022/0120847 A1* | 4/2022 | Zhang | G01S 13/426 |
| 2022/0131279 A1* | 4/2022 | Kim | H01Q 21/24 |
| 2022/0393341 A1 | 12/2022 | Shams | |
| 2022/0404457 A1* | 12/2022 | Mori | G01S 7/032 |
| 2023/0069118 A1* | 3/2023 | Zhu | G01S 13/42 |
| 2023/0114757 A1* | 4/2023 | Fabrega Sanchez | H01Q 21/062 343/772 |
| 2024/0213680 A1* | 6/2024 | Nemoto | H01Q 21/29 |
| 2024/0243486 A1* | 7/2024 | Hashimoto | G01S 13/42 |
| 2024/0250444 A1* | 7/2024 | Wang | H01Q 13/10 |
| 2024/0291149 A1* | 8/2024 | Woo | H01Q 5/335 |
| 2025/0096455 A1* | 3/2025 | Mori | H01Q 21/29 |

FOREIGN PATENT DOCUMENTS

| | | |
|---|---|---|
| JP | 2021517760 A | 7/2021 |
| WO | 2020170722 A1 | 8/2020 |
| WO | 2022061937 A1 | 3/2022 |

\* cited by examiner

ANTENNA DEVICE

CROSS-REFERENCE TO RELATED APPLICATIONS

This application is based upon and claims the benefit of priority from Japanese Patent Application No. 2023-005140, filed on Jan. 17, 2023; the entire contents of which are incorporated herein by reference.

FIELD

Embodiments of the invention generally relate to an antenna device.

BACKGROUND

For example, improved performance is desired in antenna devices.

DETAILED DESCRIPTION

Figure 1:
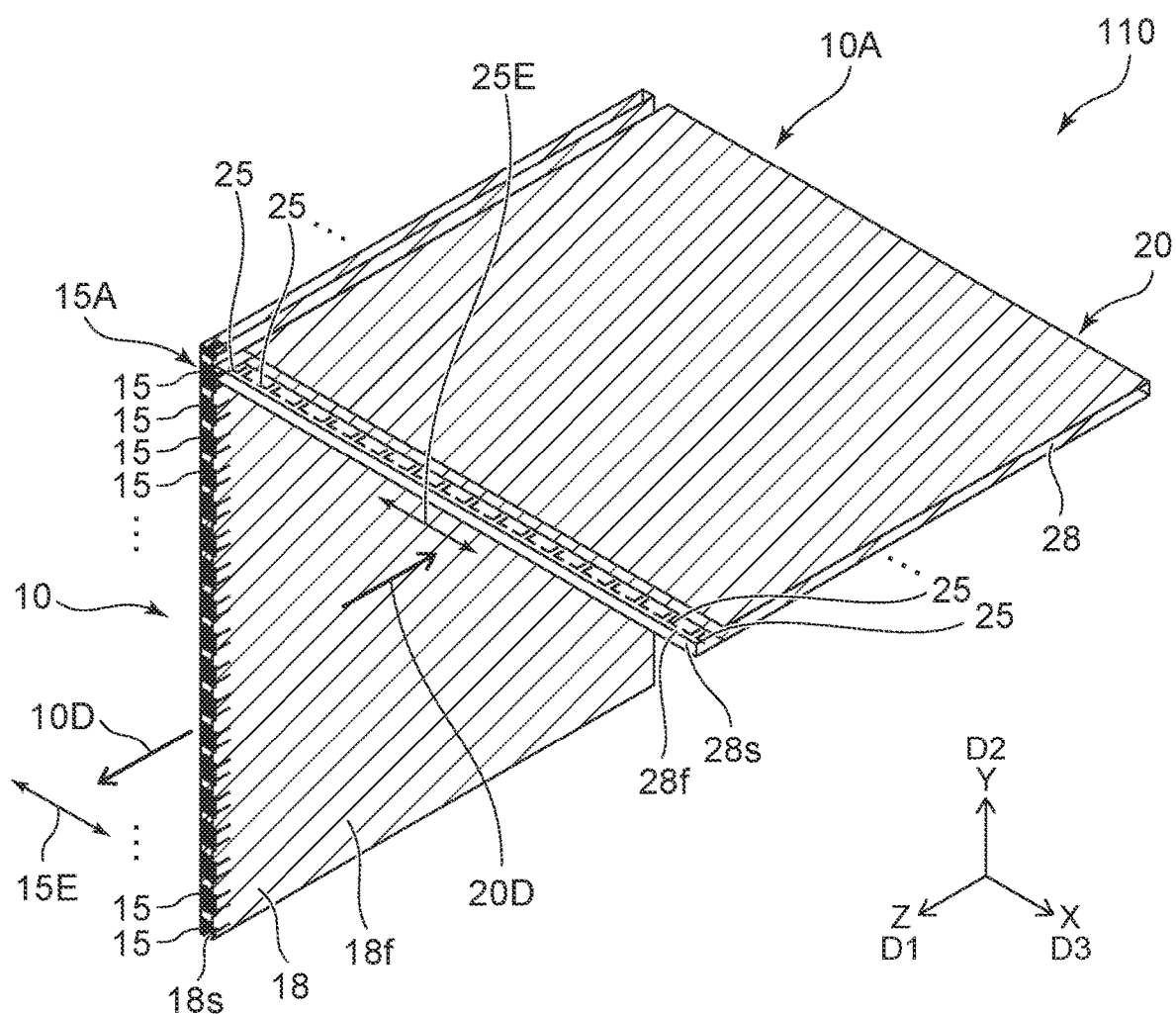
FIG. 1 is a schematic perspective view illustrating an antenna device according to a first embodiment.

According to one embodiment, an antenna device includes a first antenna and a second antenna. The first antenna includes a first substrate and a plurality of first elements. The first substrate includes a first face along a first direction and a second direction. The plurality of first elements are arranged along the second direction. The second antenna includes a second substrate and a plurality of second elements. The second substrate includes a second face along the first direction and a third direction. The plurality of second elements are arranged along the third direction. The third direction crosses a plane including the first direction and the second direction. One of the plurality of first elements overlaps the second substrate in the third direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic perspective view illustrating an antenna device according to a first embodiment.

Figure 2:
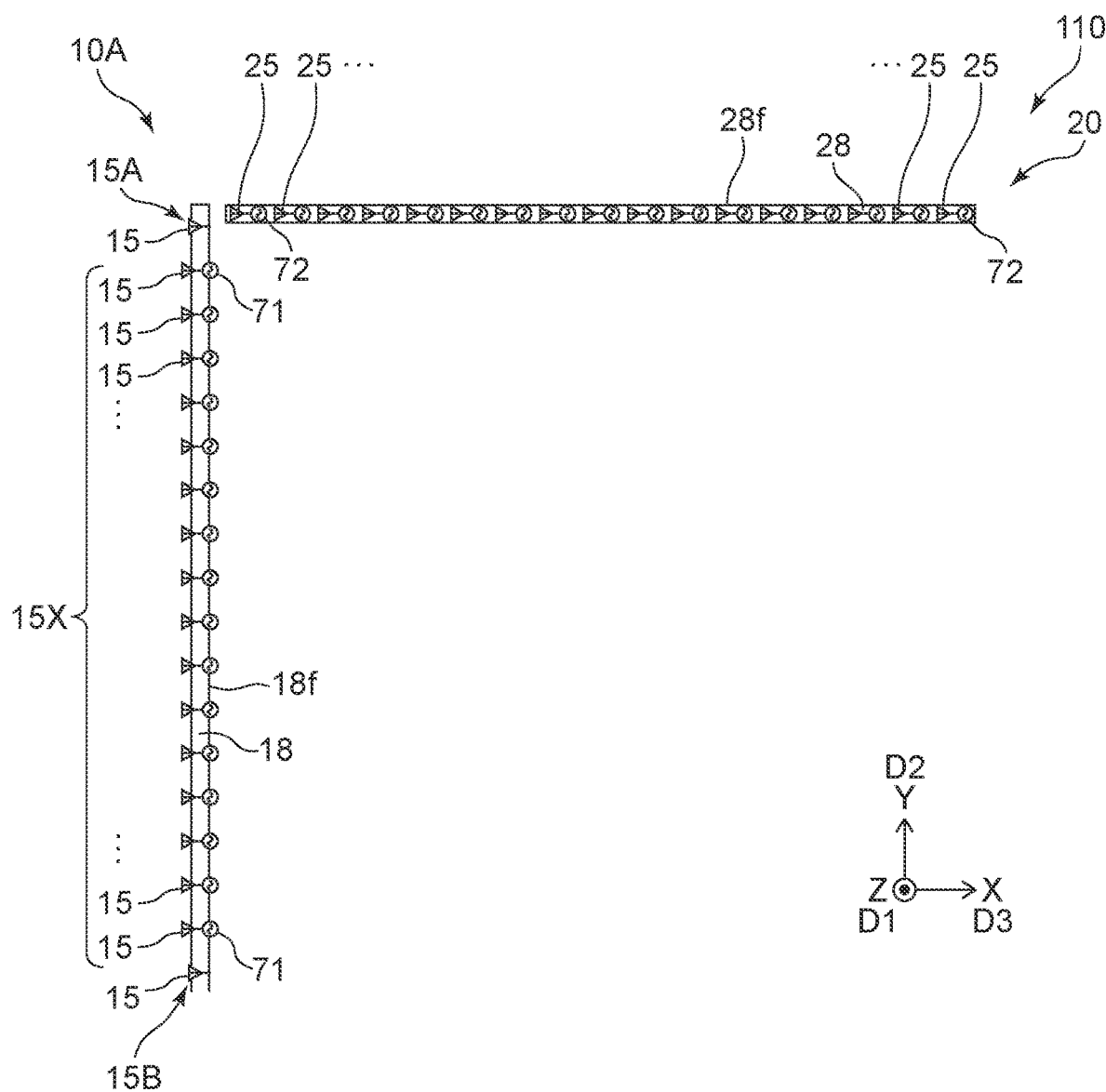
FIG. 2 is a schematic side view illustrating the antenna device according to the first embodiment.

FIG. 2 is a schematic side view illustrating the antenna device according to the first embodiment.

As shown in FIG. 1, an antenna device 110 according to the embodiment includes a first antenna 10 and a second antenna 20. The first antenna 10 and the second antenna 20 are included in the element section 10A.

The first antenna 10 includes a first substrate 18 and a plurality of first elements 15. The first substrate 18 includes a first face 18f. The first face 18f extends along a first direction D1 and a second direction D2. The plurality of first elements 15 are arranged along the second direction D2.

The first direction D1 is defined as a Z-axis direction. One direction perpendicular to the Z-axis direction is defined as a Y-axis direction. A direction perpendicular to the Z-axis direction and the Y-axis direction is defined as an X-axis direction. The second direction D2 may be, for example, the Y-axis direction.

The second antenna 20 includes a second substrate 28 and a plurality of second elements 25. The second substrate 28 includes a second face 28f. The second face 28f extends along the first direction D1 and a third direction D3. The third direction D3 crosses a plane including the first direction D1 and the second direction D2. The third direction D3 may be, for example, the X-axis direction. The plurality of second elements 25 are arranged along the third direction D3.

For example, the first antenna 10 is one of a transmitting antenna and a receiving antenna. The second antenna 20 is the other of the transmitting antenna and the receiving antenna. For example, the first antenna 10 may be a transmitting antenna and the second antenna 20 may be a receiving antenna. Alternatively, the first antenna 10 may be a receiving antenna and the second antenna 20 may be a transmitting antenna. A case will be described below where the first antenna 10 is a transmitting antenna and the second antenna 20 is a receiving antenna.

For example, the transmitting direction 10D of the transmitting antenna (e.g., the first antenna 10) is along the first direction D1. The receiving direction 20D of the receiving antenna (for example, the second antenna 20) is along the first direction D1.

For example, radio waves are transmitted from each of the plurality of first elements 15. Radio waves are reflected by an object, for example. The reflected radio waves enter the plurality of second elements 25. The reflected radio waves are detected by the plurality of second elements 25.

Furthermore, a virtual antenna can be generated at the midpoint between a position of one of the plurality of first elements 15 in the second direction D2 and a position of one of the plurality of second elements 25 in the third direction D3. A received signal at the position of the virtual antenna can be obtained. The antenna device 110 can be used, for example, as a radar device. The antenna device 110 can be used, for example, as an inspection device.

The plurality of virtual antennas correspond, for example, to a two-dimensional virtual array. In this configuration, even if an element is provided at the corner portion where the first substrate 18 and the second substrate 28 intersect, the element cannot be used for detection. Therefore, in the general technical concept, no element is provided at the corner portion.

On the other hand, in the embodiment, as shown in FIGS. 1 and 2, one of the plurality of first elements 15 (element 15A) overlaps the second substrate 28 in the third direction D3. The element 15A included in one of the plurality of first elements 15 need not function in detection. The element 15A is, for example, a dummy element. One element 15A of the plurality of first elements 15 is an end of the plurality of first elements 15.

In the plurality of first elements 15, in the element excluding the end, another element exists on both sides thereof. Therefore, the characteristics of the elements excluding the ends are affected by the elements on both sides. The characteristic difference is sufficiently small in the plurality of elements, except the end, affected by the elements on both sides.

On the other hand, in the end element, there is no other element on one side. Therefore, the characteristics of the end elements are different from those of the elements excluding the end elements. Therefore, it is difficult to detect the desired high accuracy.

In the embodiment, one of the plurality of first elements 15 (elements 15A) is provided at a position crossing the second substrate 28. By providing the element 15A, the characteristic difference of the elements is sufficiently small in a plurality of first elements 15 excluding the element 15A. Since the element 15A is not used for detection, detection with high accuracy becomes possible. The antenna device 110 can be miniaturized by providing the element 15A which does not contribute to the detection in the corner portion. According to the embodiment, an antenna device capable of improving performance can be provided.

By providing the element 15A, it is possible to improve the characteristics (for example, the directivity) of the element at the end where the directivity tends to be disturbed.

In the embodiments, the second direction D2 may be perpendicular to the first direction D1. The third direction D3 may be perpendicular to the first direction D1 and the second direction D2.

In the embodiment, the first electric field direction 15E of the polarized waves of the plurality of first elements 15 is preferably along the third direction D3. The second electric field direction 25E of the polarized waves of the plurality of second elements 25 is preferably along the third direction D3.

In the case where the first electric field direction 15E is along the third direction D3, the electric field in the first electric field direction 15E is substantially perpendicular to the first face 18f of the first substrate 18. In this case, the electric field in the first electric field direction 15E is incident perpendicularly to the conductive layer for the waveguide provided in the first antenna 10. Therefore, the radio wave having an electric field in the first electric field direction 15E is hardly attenuated along the conductive layer for the waveguide. In the plurality of first elements 15 having the first electric field direction 15E, backward radiation occurs in addition to forward radiation. In the case where a director is provided to suppress backward radiation, the antenna of interest and the director of the adjacent antenna interact. In such a plurality of first elements 15, a difference in characteristics between the end element and the element excluding the end element is likely to occur remarkably.

In the plurality of second elements 25, in the case where the second electric field direction 25E is along the third direction D3, the electric field in the second electric field direction 25E is substantially parallel to the second face 28f of the second substrate 28. In this case, the electric field in the second electric field direction 25E is incident in parallel to the conductive layer for the waveguide provided in the second antenna 20. Therefore, the radio wave having an electric field in the second electric field direction 25E is easily attenuated along the conductive layer for the waveguide. In the plurality of second elements 25 having the second electric field direction 25E, backward radiation is suppressed. In such a plurality of second elements 25, a difference in characteristics between an end element and an element excluding the end is practically allowed.

In the embodiment, one of the plurality of first elements 15 (elements 15A) having the first electric field direction 15E along the third direction D3 is provided at the corner portion where the first substrate 18 and the second substrate 28 intersect. One (element 15A) of the plurality of first elements 15 having a large influence of a difference in characteristics is provided as a dummy element in the corner portion. Thereby, the characteristic difference of the plurality of elements can be sufficiently reduced.

As shown in FIG. 1, the first substrate 18 includes a first side face 18s. The first side face 18s crosses the first direction D1. The second substrate 28 includes a second side face 28s. The second side face 28s crosses the first direction D1. For example, the transmitting direction 10D can be substantially perpendicular to the first side face 18s. The receiving direction 20D may for example, be substantially perpendicular to the second side face 28s.

As shown in FIG. 2, the plurality of first elements 15 are coupled with a first circuit 71. One of the plurality of first elements 15 (element 15A) may not be coupled with the first circuit 71. Alternatively, the element 15A may be coupled with the first circuit 71, in which case the element 15A is not used for inspection operations or the like. As shown in FIG. 2, the plurality of second elements 25 are coupled with the second circuit 72. One of the first circuit 71 and the second circuit 72 is a transmitting circuit, and the other of the first circuit 71 and the second circuit 72 is a receiving circuit.

As shown in FIG. 2, another one (element 15B) of the plurality of first elements 15 may be a dummy element. Other parts of the plurality of first elements 15 are provided between the elements 15B and 15A. The characteristic difference can be sufficiently reduced in other parts of the plurality of first elements 15.

In the embodiment, each of the plurality of first elements 15 includes, for example, an SIW (Substrate Integrated Waveguide). Each of the plurality of first elements 15 may for example, further include a director.

Examples of the plurality of first elements 15 will be described below.

Figure 3:
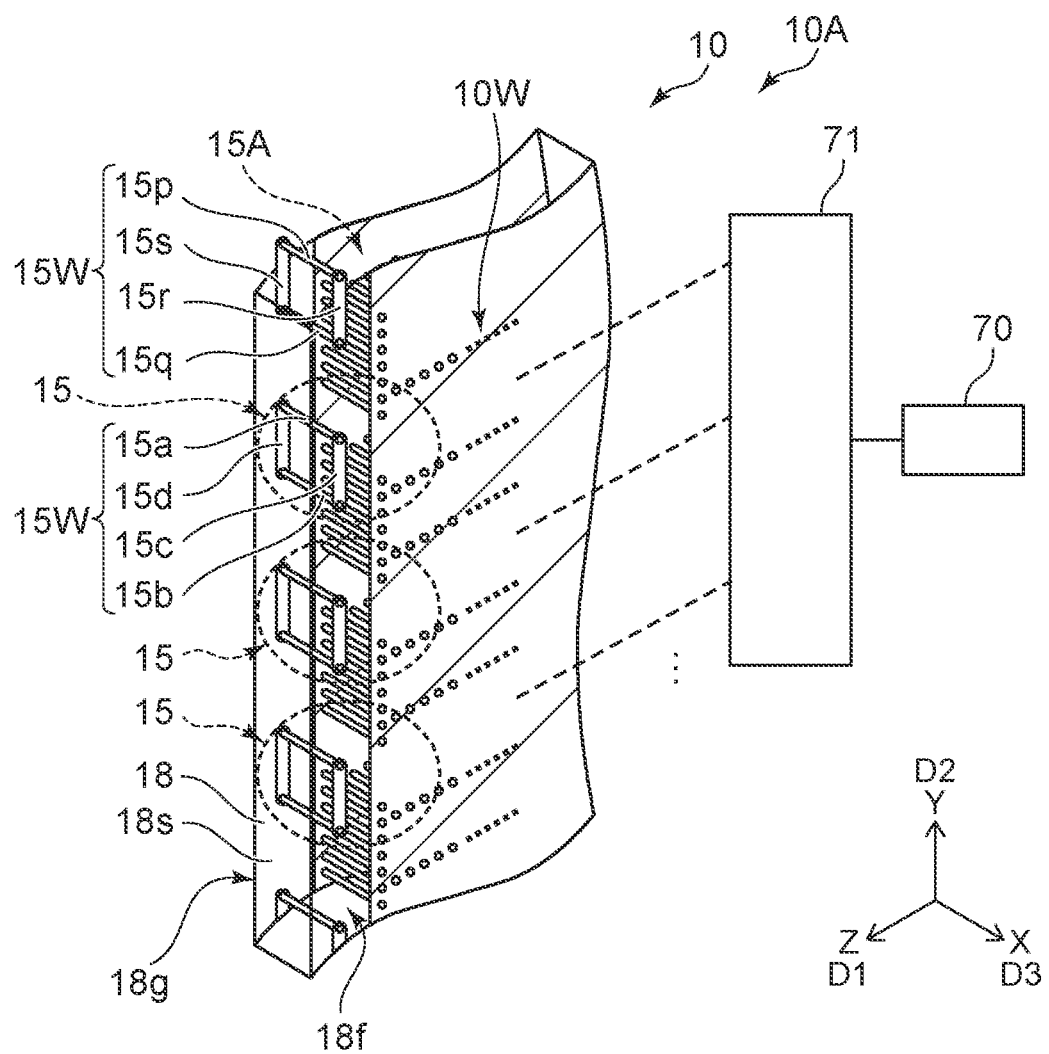
FIG. 3 is a schematic perspective view illustrating a part of the antenna device according to the first embodiment.

FIG. 3 is a schematic perspective view illustrating a part of the antenna device according to the first embodiment.

Figure 4:
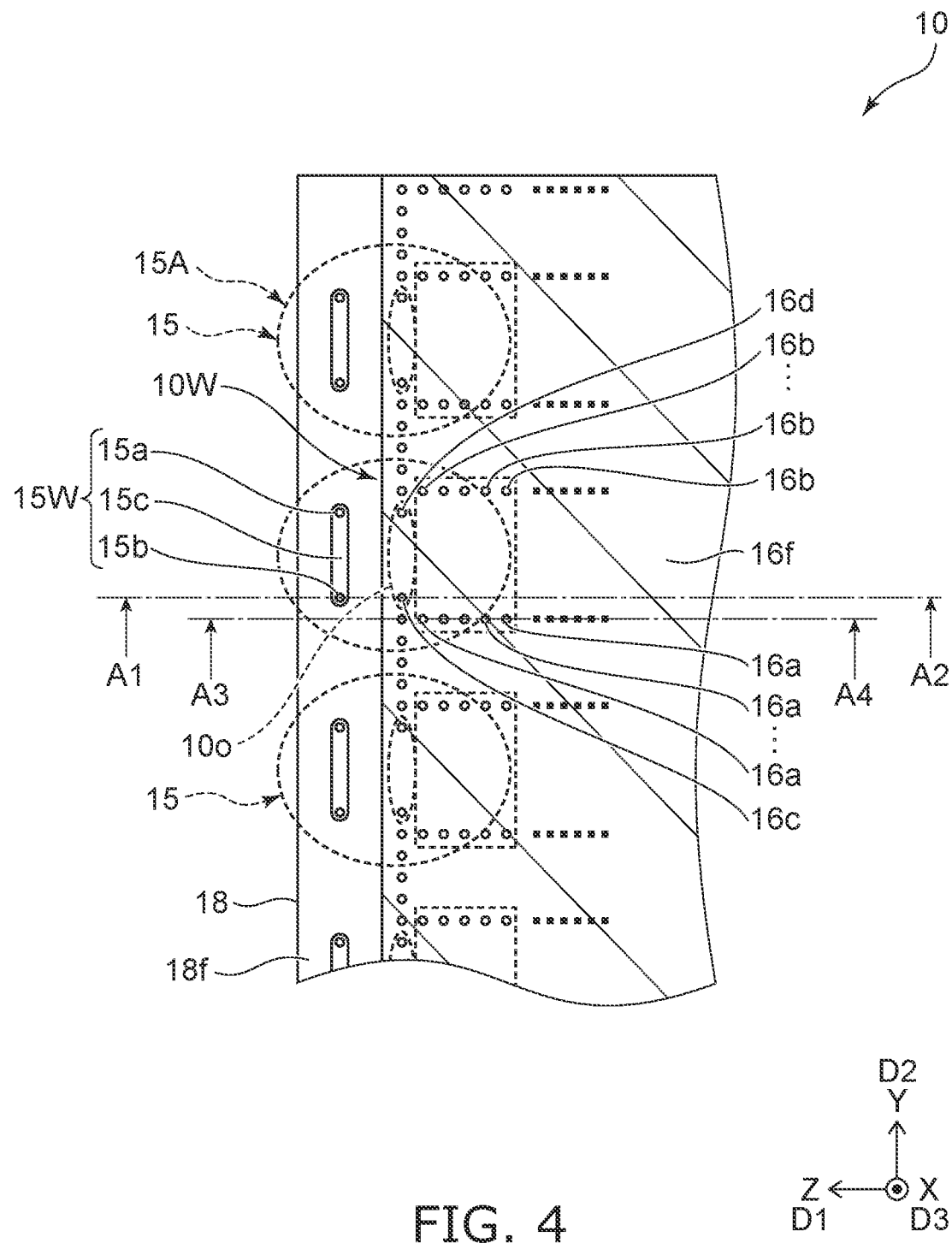
FIG. 4 is a schematic plan view illustrating the part of the antenna device according to the first embodiment.

FIG. 4 is a schematic plan view illustrating the part of the antenna device according to the first embodiment.

Figure 5:
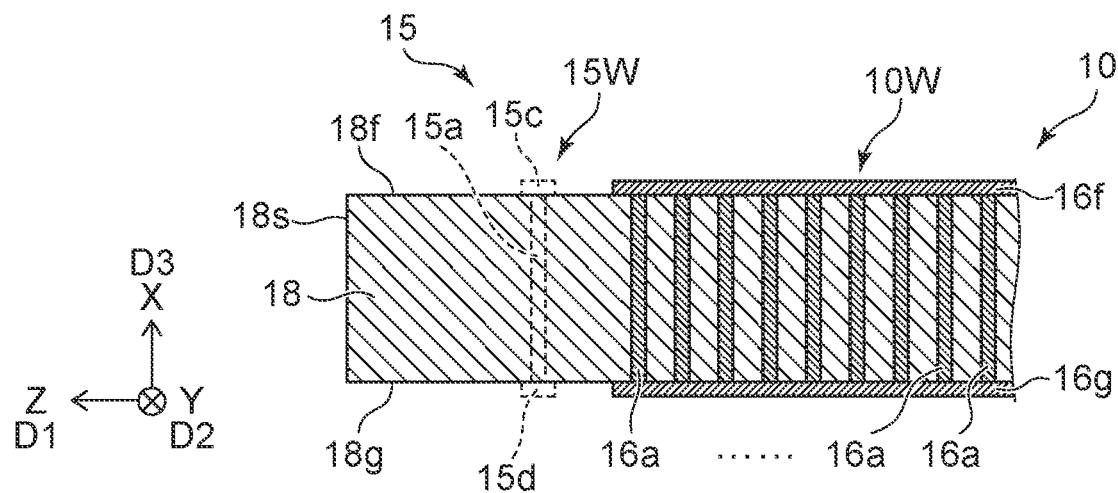
FIG. 5 is a schematic cross-sectional view illustrating the part of the antenna device according to the first embodiment.
Figure 6:
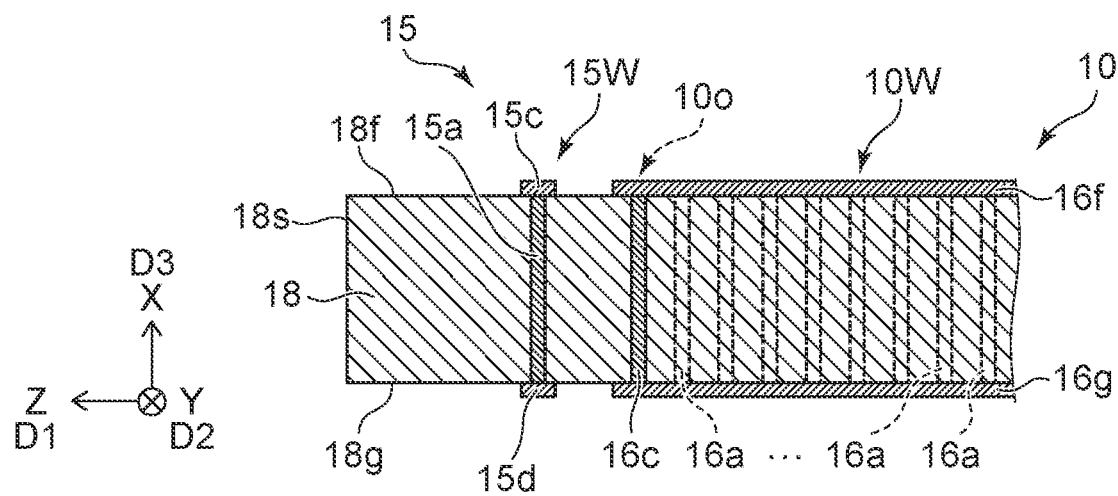
FIG. 6 is a schematic cross-sectional view illustrating the part of the antenna device according to the first embodiment.

FIGS. 5 and 6 are schematic cross-sectional views illustrating the part of the antenna device according to the first embodiment.

FIG. 5 is a cross-sectional view taken along the line A1-A2 of FIG. 4. FIG. 6 is a cross-sectional view taken along the line A3-A4 of FIG. 4.

These figures illustrate the plurality of first elements 15. As shown in FIGS. 3-6, one of the plurality of first elements 15 (e.g., each of the plurality of first elements 15) includes a first structure 10W. One of the plurality of first structures 10W is included in one of the plurality of first elements 15.

The plurality of first structures 10W are, for example, SIWs (Substrate Integrated Waveguides).

As shown in FIGS. 4 to 6, the first structure 10W includes a first waveguide conductive layer 16f, a first other waveguide conductive layer 16g, a plurality of first waveguide electrode members 16a, and a plurality of second waveguide electrode members 16b. A direction from the first other waveguide conductive layer 16g to the first waveguide conductive layer 16f is along the third direction D3. As shown in FIG. 4, a direction from the plurality of first waveguide electrode members 16a to the plurality of second waveguide electrode members 16b is along the second direction D2. The first waveguide conductive layer 16f and the first other waveguide conductive layer 16g are electrically connected by the plurality of first waveguide electrode members 16a and the plurality of second waveguide electrode members 16b.

In this example, a third waveguide electrode member 16c and a fourth waveguide electrode member 16d are provided. The third waveguide electrode member 16c and the fourth waveguide electrode member 16d are electrically connected to the first waveguide conductive layer 16f and the first other waveguide conductive layer 16g. A distance along the second direction D2 between the third waveguide electrode member 16c and the fourth waveguide electrode member 16d is shorter than a distance along the second direction D2 between the plurality of first waveguide electrode members 16a and the plurality of second waveguide electrode members 16b. The third waveguide electrode member 16c and the fourth waveguide electrode member 16d may be omitted.

A part of the first substrate 18 is provided between the first waveguide conductive layer 16f and the first other waveguide conductive layer 16g, and between the plurality of first waveguide electrode members 16a and the plurality of second waveguide electrode members 16b.

The first structure 10W includes an aperture 10o. The aperture 10o is provided at the end of the first structure 10W in the first direction D1. The aperture 10o functions as an aperture antenna. For example, radio waves are radiated from the aperture 10o.

As shown in FIGS. 3-6, one of the plurality of first elements 15 (each of the plurality of first elements 15) may include a director 15W. One of the plurality of directors 15W is included in one of the plurality of first elements 15. The director 15W includes a first conductive layer 15c, a first other conductive layer 15d, a first electrode member 15a and a first other electrode member 15b. As shown in FIGS. 5 and 6, a direction from the first other conductive layer 15d to the first conductive layer 15c is along the third direction D3. As shown in FIGS. 3 and 4, a direction from the first other electrode member 15b to the first electrode member 15a is along the second direction D2. The first conductive layer 15c and the first other conductive layer 15d are electrically connected to each other by the first electrode member 15a and the first other electrode member 15b.

At least a part of the first substrate 18 is provided between the first conductive layer 15c and the first other conductive layer 15d and between the first electrode member 15a and the first other electrode member 15b.

A position of the third waveguide electrode member 16c in the first direction D1 is between a position of the first conductive layer 15c in the first direction D1 and a position of the plurality of first waveguide electrode members 16a in the first direction D1. A position of the fourth waveguide electrode member 16d in the first direction D1 is between a position of the first conductive layer 15c in the first direction D1 and a position of the plurality of second waveguide electrode members 16b in the first direction D1. The plurality of first waveguide electrode members 16a and the plurality of second waveguide electrode members 16b forming the aperture 10o may face one of the plurality of directors 15W. The third waveguide electrode member 16c and the plurality of fourth waveguide electrode members 16d forming the aperture 10o may face one of the plurality of directors 15W.

As shown in FIGS. 4 to 6, a direction from the first waveguide conductive layer 16f to the first conductive layer 15c is along the first direction D1. A direction from the first other waveguide conductive layer 16g to the first other conductive layer 15d is along the first direction D1. The first other waveguide conductive layer 16g may be, for example, at a fixed potential (e.g., ground potential).

For example, the first substrate 18 includes a first face 18f and a first other face 18g. A direction from the first other face 18g to the first face 18f is along the third direction D3. For example, the first conductive layer 15c is provided on the first face 18f. The first other conductive layer 15d is provided on the first other face 18g. The first electrode member 15a and the first other electrode member 15b extend in the first substrate 18 along the third direction D3.

As shown in FIG. 3, the element 15A may have the same structure as the other one of the plurality of first elements 15. As shown in FIG. 3, in the element 15A, the directors 15W includes a first dummy conductive layer 15r, a first dummy other conductive layer 15s, a first dummy electrode member 15p, and a first other dummy electrode member 15q. A direction from the first dummy other conductive layer 15s to the first dummy conductive layer 15r is along the third direction D3. A direction from the first other dummy electrode member 15q to the first dummy electrode member 15p is along the second direction D2. The first dummy conductive layer 15r and the first dummy other conductive layer 15s are electrically connected to each other by the first dummy electrode member 15p and the first other dummy electrode member 15q. At least a part of the first substrate 18 is provided between the first dummy conductive layer 15r and the first dummy other conductive layer 15s, and between the first dummy electrode member 15p and the first other dummy electrode member 15q.

For example, the first dummy conductive layer 15r is provided on the first face 18f. The first dummy other conductive layer 15s is provided on the first other face 18g. The first dummy electrode member 15p and the first other dummy electrode member 15q extend in the first substrate 18 along the third direction D3.

One of the plurality of directors 15W is couplable with one of the plurality of first structures 10W.

The director 15W included in the one (element 15A) of the plurality of first elements 15 may not be coupled to any of the plurality of first structures 10W. Alternatively, the director 15W included in the one (element 15A) of the plurality of first elements 15 may be couplable with one of the plurality of first structures 10W. In this case, for example, the one of the plurality of first structures 10W is not used for operation.

As described with reference to FIG. 2, the antenna device 110 may include a first circuit 71. The first circuit 71 can be coupled with the plurality of first elements 15. The plurality of first elements 15 include another first elements 15X except one (element 15A) of the plurality of first elements 15. The first circuit 71 transmits and receives signals with the other first element 15X in one operation (for example, a first operation). The first circuit 71 does not transmit and receive signals with one of the first elements 15 (element 15A) in the first operation. By operation of the first circuit 71, the element 15A functions as a dummy element. The first operation is, for example, one of transmitting and receiving.

As shown in FIG. 3, the antenna device 110 may include a processor 70. The processor 70 can process signals obtained from the element section 10A including the first antenna 10 and the second antenna 20. In the processing operation, the processor 70 does not use the signal corresponding to one of the plurality of first elements 15 (the element 15A) for processing. For example, the element 15A may function as a dummy element by the operation of the processor 70.

Examples of the plurality of second elements 25 will be described below.

Figure 7:
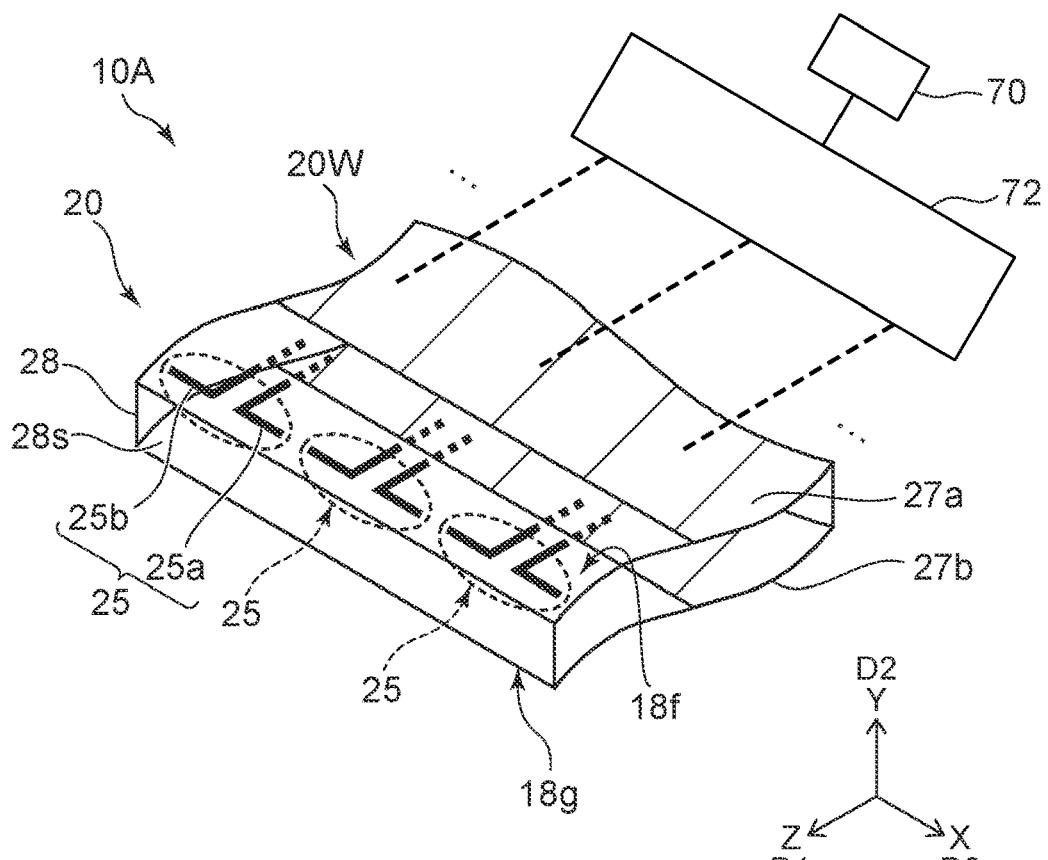
FIG. 7 is a schematic perspective view illustrating a part of the antenna device according to the first embodiment.

FIG. 7 is a schematic perspective view illustrating a part of the antenna device according to the first embodiment.

Figure 8:
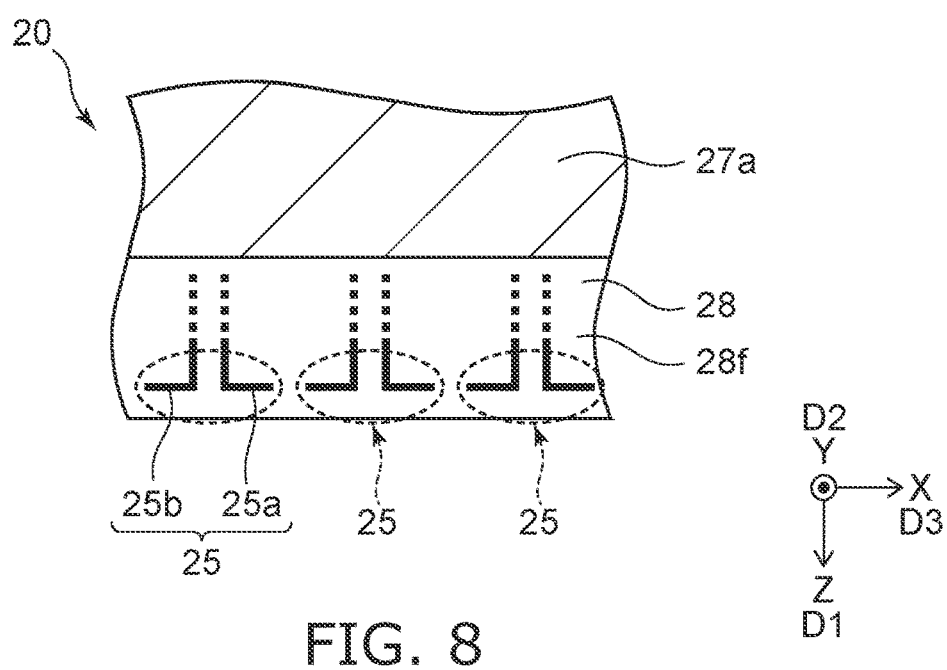
FIG. 8 is a schematic plan view illustrating the part of the antenna device according to the first embodiment.

FIG. 8 is a schematic plan view illustrating the part of the antenna device according to the first embodiment.

These figures illustrate the plurality of second elements 25. As shown in FIGS. 7 and 8, each of the plurality of second elements 25 includes a second conductive layer 25a. At least a part of the second conductive layer 25a extends along the third direction D3. Each of the plurality of second elements 25 may include a second other conductive layer 25b. At least a part of the second other conductive layer 25b extends along the third direction D3. A direction from the second other conductive layer 25b to the second conductive layer 25a is along the third direction D3. The second conductive layer 25a and the second other conductive layer 25b are, for example, a dipole antenna.

The second conductive layer 25a and the second other conductive layer 25b are provided on the second face 28f of the second substrate 28, for example.

As shown in FIG. 7, the second antenna 20 may include a second waveguide conductive layer 27a and a second other waveguide conductive layer 27b. A direction from the second other waveguide conductive layer 27b to the second waveguide conductive layer 27a is along the second direction D2. A part of the second substrate 28 is provided between the second other waveguide conductive layer 27b and the second waveguide conductive layer 27a. The second waveguide conductive layer 27a can be coupled with the second conductive layer 25a (and the second other conductive layer 25b). The second other waveguide conductive layer 27b may be, for example, at a fixed potential (e.g., ground potential). A plurality of second waveguide conductive layers 27a may be provided. One of the plurality of second waveguide conductive layers 27a can be coupled with the second conductive layer 25a (and the second other conductive layer 25b).

For example, the second substrate 28 may include a second other face 28g. A direction from the second other face 28g to the second face 28f is along the second direction D2. The second waveguide conductive layer 27a is provided, for example, on the second face 28f. The second other waveguide conductive layer 27b is provided, for example, on the second other face 28g.

For example, each of the plurality of first elements 15 may include an SIW. For example, each of the plurality of second elements 25 may include a dipole antenna.

As shown in FIG. 7, the antenna device 110 may include a second circuit 72. The second circuit 72 can be coupled with the plurality of second elements 25. The second circuit 72 transmits and receives signals with the plurality of second elements 25 in a second operation. The second operation is, for example, the other of transmitting and receiving.

As described above, the antenna device 110 according to the embodiment includes the first antenna 10 and the second antenna 20. The first antenna 10 includes the plurality of first elements 15 and a dummy element (element 15A). The second antenna 20 includes the plurality of second elements 25. One of the plurality of first elements 15 and the plurality of second elements 25 can transmit radio waves in the first direction D1. The other of the plurality of first elements 15 and the plurality of second elements 25 can receive radio waves in the first direction D1. The plurality of first elements 15 are arranged along the second direction D2 crossing the first direction D1. The direction from the plurality of first elements 15 to the first dummy element (element 15A) is along the second direction D2. The plurality of second elements 25 are arranged along the third direction D3 crossing a plane including the first direction D1 and the second direction D2. The first electric field direction 15E of the polarized waves of the plurality of first elements 15 is along the third direction D3. The second electric field direction 25E of the polarized wave of the plurality of second elements 25 is along the third direction D3.

Second Embodiment

Figure 9:
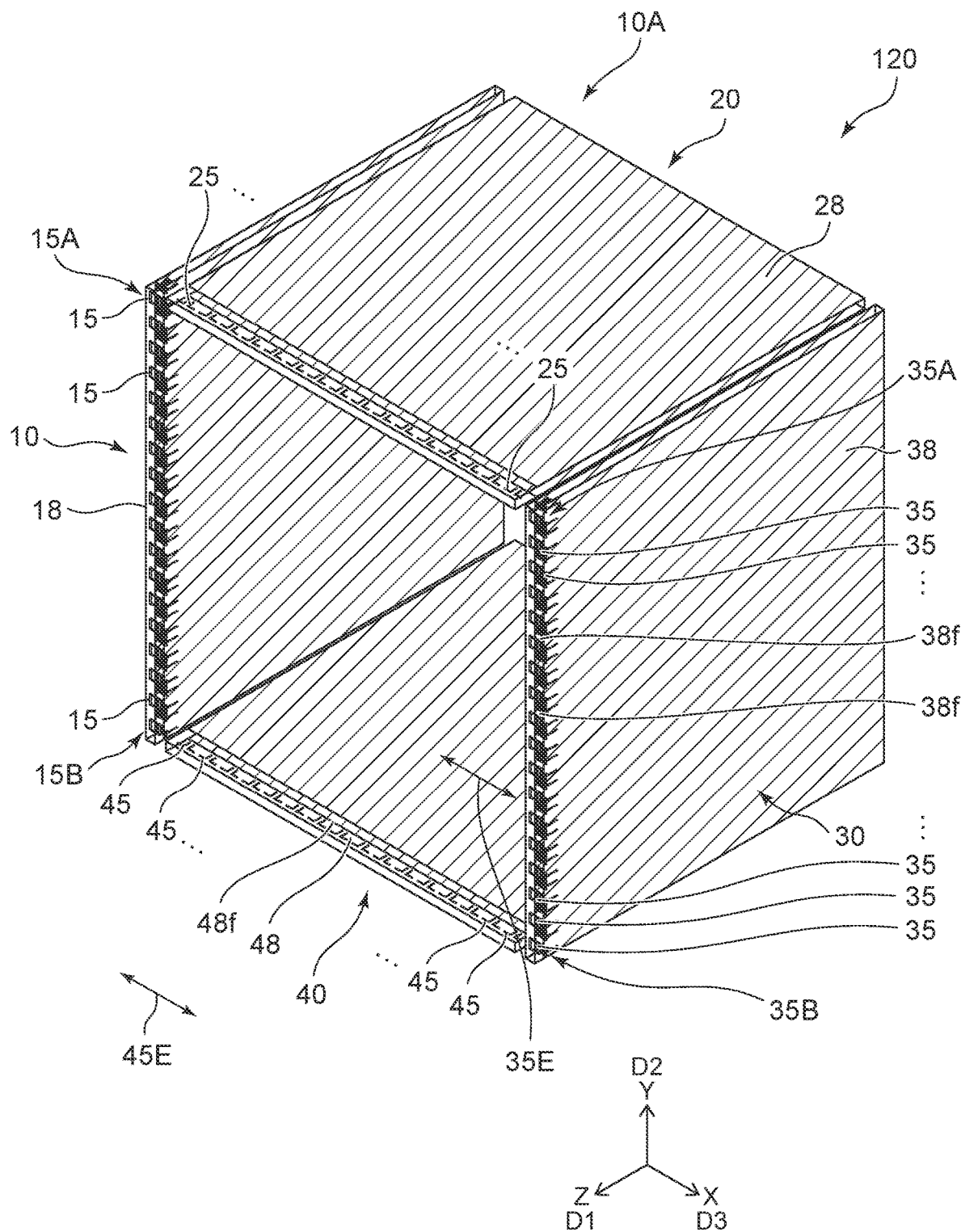
FIG. 9 is a schematic perspective view illustrating an antenna device according to a second embodiment.

FIG. 9 is a schematic perspective view illustrating an antenna device according to a second embodiment.

As shown in FIG. 9, the antenna device 120 according to the embodiment includes a third antenna 30 in addition to the first antenna 10 and the second antenna 20.

The third antenna 30 includes a third substrate 38 and a plurality of third elements 35. The third substrate 38 includes a third face 38f. The third face 38f extends along the first direction D1 and the second direction D2. The third elements 35 are arranged along the second direction D2.

At least a part of the second substrate 28 is provided between one (element 15A) of the plurality of first elements 15 and one (element 35A) of the plurality of third elements 35 in the third direction D3. The element 35A is, for example, a dummy element. The element 35A is an end of the plurality of third elements 35.

By providing the element 35A, it is possible to sufficiently reduce the characteristic difference in the plurality of third elements 35 excluding the ends.

The configuration of the plurality of third elements 35 may be the same as the configuration of the plurality of first elements 15.

As shown in FIG. 4, the antenna device 120 may include a fourth antenna 40. The fourth antenna 40 includes a fourth substrate 48 and a plurality of fourth elements 45. The fourth substrate 48 includes a fourth face 48f. The fourth face 48f extends along the first direction D1 and the third direction D3. The plurality of fourth elements 45 are arranged along the third direction D3.

Another one (element 15B) of the plurality of first elements 15 overlaps the fourth substrate 48 in the third direction D3. Another one (element 35B) of the plurality of third elements 35 overlaps the fourth substrate 48 in the third direction D3. At least a part of the fourth substrate 48 is, for example, provided between the element 15B and the element 35B in the third direction D3.

The configuration of the plurality of fourth elements 45 may be the same as the configuration of the plurality of second elements 25. For example, a third electric field direction 35E of the polarized waves of the plurality of third elements 35 is along the third direction D3. A fourth electric field direction 45E of the polarized waves of the plurality of fourth elements 45 is along the third direction D3.

In the embodiment, the antenna device can be miniaturized. For example, a plurality of configurations (including four antennas) of the antenna device 120 may be combined. The lower limit of the interval of a plurality of configurations including four antennas can be relaxed. For example, the degradation of the radiation characteristics of the virtual array can be suppressed.

The antenna device described above can be used in a radar device. The embodiments may include a radar device. The radar device is provided in facilities. The facilities include, for example, airports, train stations, shopping malls, concert halls, or exhibition halls. The radar device is used, for example, when conducting a safety inspection to determine whether or not an inspection target person (user of a facility) is carrying a dangerous object.

For example, the radar device sequentially radiates radio waves to each point of the target person and sequentially receives radio waves reflected by each point of the target person. The target person is thereby scanned. An image including the target person is generated based on the received signals obtained by the scanning.

A facility administrator can determine whether or not the target person has a dangerous object by checking this image. The administrator can determine, for example, whether or not a dangerous item is hidden in the subject's belongings. The radar device or an external device may analyze the amplitude of the received signal. The radar device or an external device may warn of the level of likelihood that the target person is in possession of a hazardous item.

For example, in security inspections, multiple hazardous materials are detected in clothing pockets. High angular resolution is required for the radar devices used for the security inspections. Angular resolution is determined by the aperture length of the array antenna. For example, according to MIMO (multi-input and multi-output) radar, the aperture length is enlarged and the angular resolution is improved. Multiple antennas are provided in MIMO radar. This complicates the design and increases the cost. In the embodiments, the array antenna includes a small number of antennas. In the embodiments, a design for easy wiring is applied.

Figure 10:
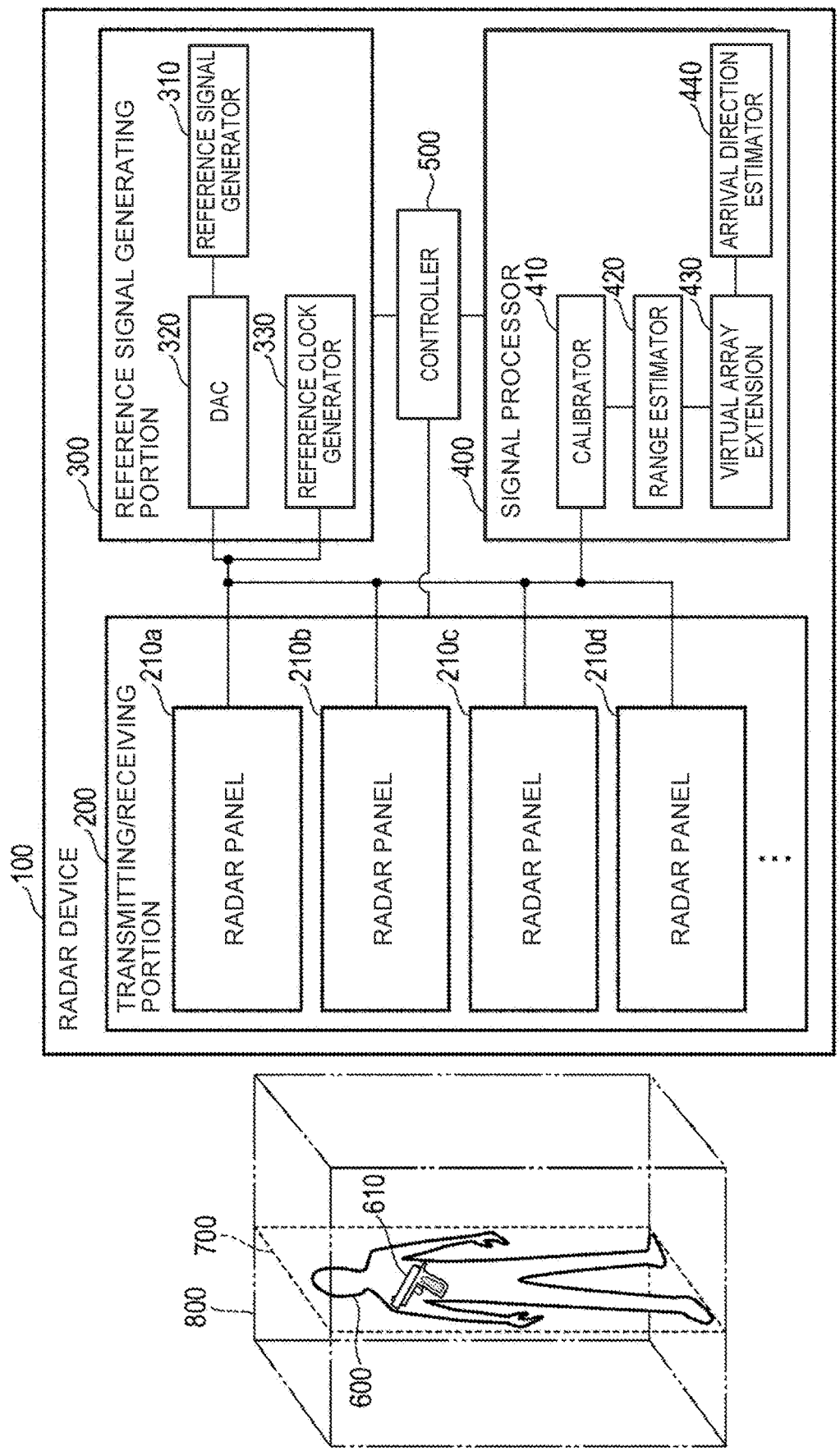
FIG. 10 is a block diagram illustrating the radar device according to the embodiment.

FIG. 10 is a block diagram illustrating the radar device according to the embodiment.

A radar device 100 includes, for example, a transmitting/receiving portion 200, a reference signal generating portion 300, a signal processor 400 and a controller 500.

The reference signal generating portion 300 includes a reference signal generator 310, a DAC (Digital to Analog Converter) 320 and a reference clock generator 330.

Various systems can be adopted as the radar system. For example, an FMCW (Frequency Modulated Continuous Wave) system can be adopted. In the FMCW radar, radio waves are radiated to a target and reflected radio waves from the target are received. In the FMCW radar, the distance to the target can be measured from the difference between the frequency of the transmitting signal and the frequency of the receiving signal.

The reference signal generator 310 generates, for example, a digital signal. This digital signal represents the FMCW signal (hereinafter referred to as the chirp signal). The frequency of the FMCW signal linearly increases over time.

The DAC 320 converts the digital signal generated by reference signal generator 310 into an analog signal. The DAC 320 generates a chirp signal of the analog signal.

The reference clock generator 330 generates a reference clock.

The chirp signal and the reference clock generated by the reference signal generating portion 300 are output to the transmitting/receiving portion 200. The connection between the reference signal generating portion 300 and the transmitting/receiving portion 200 is, for example, wired or wireless.

The transmitting/receiving portion 200 includes at least one (here, four) radar panels 210a, 210b, 210c and 210d. The number of radar panels included in the transmitting/receiving portion 200 may be two or more, or one.

The chirp signal and the reference clock are supplied to each of the radar panels 210a to 210d. Each of the radar panels 210a to 210d radiates radio waves corresponding to the chirp signal to the target and receives reflected radio waves from the target.

In the embodiment, the wavelength of radio waves is, for example, not less than 1 mm and not more than 30 mm. The radio waves with wavelengths not less than 1 mm and not more than 30 mm are, for example, millimeter waves. The radio waves with a wavelength of not less than 10 mm and not more than 100 mm are, for example, microwaves. The radio waves with a wavelength of not less than 100 μm and not more than 1 mm are, for example, terahertz waves. In the embodiments, millimeter waves, microwave or terahertz waves may be applied.

Each of the radar panels 210a to 210d converts the received reflected radio wave signal into an intermediate frequency signal (IF signal). The IF signal obtained by each of radar panels 210a to 210d is output to signal processor 400. The connection between each of the radar panels 210a to 210d and the signal processor 400 may be wired or wireless.

The signal processor 400 includes, for example, a calibrator 410, a range estimator 420, a virtual array extension 430 and an arrival direction estimator 440. The signal processor 400 performs signal processing on the respective IF signals of the radar panels 210a to 210d.

The signal processor 400 can obtain an image of the target person 600 in a plane 700. The plane 700 is a plane within inspection space 800. The plane 700 is parallel to radar panels 210a to 210d. The inspection space 800 is a three-dimensional space located in the radiation direction of radio waves emitted from each of the radar panels 210a to 210d. The image is displayed, for example, by a display device. For example, by observing this image, the inspector can detect that the target person 600 is carrying a dangerous object 610 (for example, a gun).

The radar device 100 may constantly radiate radio waves into the inspection space 800 to carry out the inspection at all times. The radar device 100 may include a camera that captures inspection space 800. The radar device 100 may recognize the target person 600 from the image of the inspection space 800 captured by the camera. IN a case where the target person 600 is recognized, the radar device 100 may radiate radio waves only to the target person 600 for inspection. The controller 500 controls the operation of the radar device 100.

The antenna device (antenna device 110 or antenna device 120) according to the embodiment can be applied to radar panels 210a to 210d, for example.

The embodiments may include the following configurations (for example, technical proposals).

Configuration 1

An antenna device, comprising:
a first antenna including a first substrate and a plurality of first elements, the first substrate including a first face along a first direction and a second direction, the plurality of first elements being arranged along the second direction; and
a second antenna including a second substrate and a plurality of second elements, the second substrate including a second face along the first direction and a third direction, the plurality of second elements being arranged along the third direction, the third direction crossing a plane including the first direction and the second direction, one of the plurality of first elements overlapping the second substrate in the third direction.

Configuration 2

The antenna device according to Configuration 1, wherein the one of the plurality of first elements is an end of the plurality of first elements.

Configuration 3

The antenna device according to Configuration 1 or 2, wherein
the second direction is perpendicular to the first direction, and
the third direction is perpendicular to the first direction and the second direction.

Configuration 4

The antenna device according to any one of Configurations 1-3, wherein
a first electric field direction of the polarized wave of the plurality of first elements is along the third direction, and
a second electric field direction of the polarized wave of the plurality of second elements is along the third direction.

Configuration 5

The antenna device according to any one of Configurations 1-4, wherein
the first antenna is one of a transmitting antenna and a receiving antenna, and
the second antenna is another one of the transmitting antenna and the receiving antenna.

Configuration 6

The antenna device according to Configuration 5, wherein
a transmitting direction of the transmitting antenna is along the first direction, and
a receiving direction of the receiving antenna is along the first direction.

Configuration 7

The antenna device according to any one of Configurations 1-6, wherein
each of the plurality of first elements includes a first structure,
the first structure includes a first waveguide conductive layer, a first other waveguide conductive layer, a plurality of first waveguide electrode members, and a plurality of second waveguide electrode members,
a direction from the first other waveguide conductive layer to the first waveguide conductive layer is along the third direction,
a direction from the plurality of first waveguide electrode members to the plurality of second waveguide electrode members is along the second direction,
the first waveguide conductive layer and the first other waveguide conductive layer are electrically connected by the plurality of first waveguide electrode members and the plurality of second waveguide electrode members, and
a part of the first substrate is provided between the first waveguide conductive layer and the first other waveguide conductive layer, and between the plurality of first waveguide electrode members and the plurality of second waveguide electrode members.

Configuration 8

The antenna device according to Configuration 7, wherein the first structure includes an aperture at an end of the first structure in the first direction.

Configuration 9

The antenna device according to Configuration 7 or 8, wherein
each of the plurality of first elements includes a director;
the director includes a first conductive layer, a first other conductive layer, a first electrode member and a first other electrode member,
a direction from the first other conductive layer to the first conductive layer is along the third direction,
a direction from the first other electrode member to the first electrode member is along the second direction,
the first conductive layer and the first other conductive layer are electrically connected to each other by the first electrode member and the first other electrode member,
at least a part of the first substrate is provided between the first conductive layer and the first other conductive layer, and between the first electrode member and the first other electrode member,
a direction from the first waveguide conductive layer to the first conductive layer is along the first direction, and
a direction from the first other waveguide conductive layer to the first other conductive layer is along the first direction.

Configuration 10

The antenna device according to Configuration 9, wherein the director included in the one of the plurality of first elements is not coupled with the first structure included in the one of the plurality of first elements.

Configuration 11

The antenna device according to any one of Configurations 1-10, further comprising:
a first circuit configured to be coupled with the plurality of first elements,
the plurality of first elements including another first element except the one of the plurality of first elements,
the first circuit being configured to transmit and receive a signal to and from the other first element in a first operation, the first circuit being configured not to transmit and receive the signal with the one of the plurality of first elements in the first operation.

Configuration 12

The antenna device according to any one of Configurations 1-11, further comprising:
a processor configured to process a signal obtained from an element section including the first antenna and the second antenna,
the processor being configured not to use a signal corresponding to the one of the plurality of first elements in a processing operation.

Configuration 13

The antenna device according to any one of Configurations 1-12, wherein
each of the plurality of second elements includes a second conductive layer, and
at least a part of the second conductive layer extends along the third direction.

Configuration 14

The antenna device according to Configuration 13, wherein
each of the plurality of second elements includes a second other conductive layer,
at least a part of the second other conductive layer extends along the third direction, and
a direction from the second other conductive layer to the second conductive layer is along the third direction.

Configuration 15

The antenna device according to Configuration 14, wherein
the second antenna includes a second waveguide conductive layer and a second waveguide conductive layer,
a direction from the second other waveguide conductive layer to the second waveguide conductive layer is along the second direction,
a part of the second substrate is provided between the second other waveguide conductive layer and the second waveguide conductive layer, and
the second waveguide conductive layer is couplable with the second conductive layer.

Configuration 16

The antenna device according to any one of Configurations 1-15, wherein
each of the plurality of first elements includes an SIW (Substrate Integrated Waveguides), and
each of the plurality of second elements includes a dipole antenna.

Configuration 17

The antenna device according to any one of Configurations 1-16, further comprising:
a third antenna,
the third antenna including
a third substrate including a third face along the first direction and the second direction, and
a plurality of third elements arranged along the second direction,
at least a part of the second substrate being provided between the one of the plurality of first elements and one of the plurality of third elements in the third direction.

Configuration 18

The antenna device according to Configuration 17, further comprising:
a fourth antenna,
the fourth antenna including
a fourth substrate including a fourth face along the first direction and the third direction, and
a plurality of fourth elements aligned along the third direction,
another one of the plurality of first elements overlapping the fourth substrate in the third direction, and
another one of the plurality of third elements overlapping the fourth substrate in the third direction.

Configuration 19

The antenna device according to Configuration 18, wherein
a third electric field direction of a polarized wave of the plurality of third elements is along the third direction, and
a fourth electric field direction of a polarized wave of the plurality of fourth elements is along the third direction.

Configuration 20

An antenna device, comprising:
a first antenna including a plurality of first elements and a first dummy element; and
a second antenna including a plurality of second elements,
one of the plurality of first elements and the plurality of second elements being configured to transmit radio waves in a first direction,
another one of the plurality of first elements and the plurality of second elements being configured to receive the radio waves in the first direction,
the plurality of first elements being arranged along a second direction crossing the first direction,
a direction from the plurality of first elements to the first dummy element being along the second direction,
the plurality of second elements being arranged along a third direction crossing a plane including the first direction and the second direction,
a first electric field direction of a polarized wave of the plurality of first elements being along the third direction, and
a second electric field direction of a polarized wave of the plurality of second elements being along the third direction.

According to the embodiments, it is possible to provide an antenna device capable of improving performance.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in antenna devices such as antenna, elements, substrates, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all antenna devices practicable by an appropriate design modification by one skilled in the art based on the antenna devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An antenna device, comprising:
a first antenna including a first substrate and a plurality of first elements, the first substrate including a first face along a first direction and a second direction, the plurality of first elements being arranged along the second direction; and
a second antenna including a second substrate and a plurality of second elements, the second substrate including a second face along the first direction and a third direction, the plurality of second elements being arranged along the third direction, the third direction crossing a plane including the first direction and the second direction, and one of the plurality of first elements overlapping the second substrate in the third direction,
wherein:
each of the plurality of first elements includes a first structure,
the first structure includes a first waveguide conductive layer, a first other waveguide conductive layer, a plurality of first waveguide electrode members, and a plurality of second waveguide electrode members,
a direction from the first other waveguide conductive layer to the first waveguide conductive layer is along the third direction,
a direction from the plurality of first waveguide electrode members to the plurality of second waveguide electrode members is along the second direction,
the first waveguide conductive layer and the first other waveguide conductive layer are electrically connected by the plurality of first waveguide electrode members and the plurality of second waveguide electrode members, and
a part of the first substrate is provided between the first waveguide conductive layer and the first other waveguide conductive layer, and between the plurality of first waveguide electrode members and the plurality of second waveguide electrode members.

2. The device according to claim 1, wherein
the one of the plurality of first elements overlapping the second substrate in the third direction is an end of the plurality of first elements.

3. The device according to claim 1, wherein
the second direction is perpendicular to the first direction, and
the third direction is perpendicular to the first direction and the second direction.

4. The device according to claim 1, wherein
a first electric field direction of the polarized wave of the plurality of first elements is along the third direction, and
a second electric field direction of the polarized wave of the plurality of second elements is along the third direction.

5. The device according to claim 1, wherein
the first antenna is one of a transmitting antenna and a receiving antenna, and
the second antenna is another one of the transmitting antenna and the receiving antenna.

6. The device according to claim 5, wherein
a transmitting direction of the transmitting antenna is along the first direction, and
a receiving direction of the receiving antenna is along the first direction.

7. The device according to claim 1, wherein
the first structure includes an aperture at an end of the first structure in the first direction.

8. The device according to claim 1, wherein
each of the plurality of first elements includes a director;
the director includes a first conductive layer, a first other conductive layer, a first electrode member and a first other electrode member,
a direction from the first other conductive layer to the first conductive layer is along the third direction,
a direction from the first other electrode member to the first electrode member is along the second direction,
the first conductive layer and the first other conductive layer are electrically connected to each other by the first electrode member and the first other electrode member,
at least a part of the first substrate is provided between the first conductive layer and the first other conductive layer, and between the first electrode member and the first other electrode member,
a direction from the first waveguide conductive layer to the first conductive layer is along the first direction, and
a direction from the first other waveguide conductive layer to the first other conductive layer is along the first direction.

9. The device according to claim 8, wherein
the director included in the one of the plurality of first elements is not coupled with the first structure included in the one of the plurality of first elements.

10. The device according to claim 1, further comprising:
a processor configured to process a signal obtained from an element section including the first antenna and the second antenna,
the processor being configured not to use a signal corresponding to the one of the plurality of first elements in a processing operation.

11. The device according to claim 1, further comprising:
a third antenna,
the third antenna including
a third substrate including a third face along the first direction and the second direction, and a plurality of third elements arranged along the second direction, at least a part of the second substrate being provided between the one of the plurality of first elements and one of the plurality of third elements in the third direction.

12. The device according to claim 11, further comprising:
a fourth antenna,
the fourth antenna including
   a fourth substrate including a fourth face along the first direction and the third direction, and
   a plurality of fourth elements aligned along the third direction,
another one of the plurality of first elements overlapping the fourth substrate in the third direction, and
another one of the plurality of third elements overlapping the fourth substrate in the third direction.

13. The device according to claim 12, wherein
a third electric field direction of a polarized wave of the plurality of third elements is along the third direction, and
a fourth electric field direction of a polarized wave of the plurality of fourth elements is along the third direction.

14. An antenna device comprising:
a first antenna including a first substrate and a plurality of first elements, the first substrate including a first face along a first direction and a second direction, the plurality of first elements being arranged along the second direction;
a second antenna including a second substrate and a plurality of second elements, the second substrate including a second face along the first direction and a third direction, the plurality of second elements being arranged along the third direction, the third direction crossing a plane including the first direction and the second direction, and one of the plurality of first elements overlapping the second substrate in the third direction; and
a first circuit configured to be coupled with the plurality of first elements,
the plurality of first elements including another first element except the one of the plurality of first elements,
the first circuit being configured to transmit and receive a signal to and from the other first element in a first operation,
the first circuit being configured not to transmit and receive the signal with the one of the plurality of first elements in the first operation.

15. An antenna device comprising:
a first antenna including a first substrate and a plurality of first elements, the first substrate including a first face along a first direction and a second direction, the plurality of first elements being arranged along the second direction; and
a second antenna including a second substrate and a plurality of second elements, the second substrate including a second face along the first direction and a third direction, the plurality of second elements being arranged along the third direction, the third direction crossing a plane including the first direction and the second direction, and one of the plurality of first elements overlapping the second substrate in the third direction,
wherein:
each of the plurality of second elements includes a second conductive layer, and
at least a part of the second conductive layer extends along the third direction.

16. The device according to claim 15, wherein
each of the plurality of second elements includes a second other conductive layer,
at least a part of the second other conductive layer extends along the third direction, and
a direction from the second other conductive layer to the second conductive layer is along the third direction.

17. The device according to claim 16, wherein
the second antenna includes a second waveguide conductive layer and a second waveguide conductive layer,
a direction from the second other waveguide conductive layer to the second waveguide conductive layer is along the second direction,
a part of the second substrate is provided between the second other waveguide conductive layer and the second waveguide conductive layer, and
the second waveguide conductive layer is couplable with the second conductive layer.

18. An antenna device comprising:
a first antenna including a first substrate and a plurality of first elements, the first substrate including a first face along a first direction and a second direction, the plurality of first elements being arranged along the second direction; and
a second antenna including a second substrate and a plurality of second elements, the second substrate including a second face along the first direction and a third direction, the plurality of second elements being arranged along the third direction, the third direction crossing a plane including the first direction and the second direction, and one of the plurality of first elements overlapping the second substrate in the third direction,
wherein:
each of the plurality of first elements includes an SIW (Substrate Integrated Waveguide), and
each of the plurality of second elements includes a dipole antenna.

* * * * *